Figure 1:
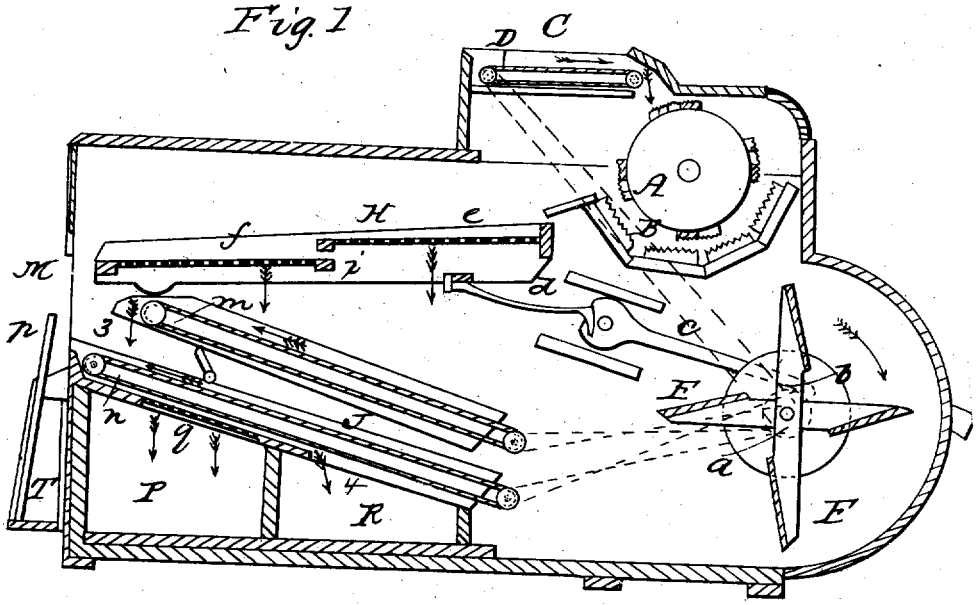
Figure 2:
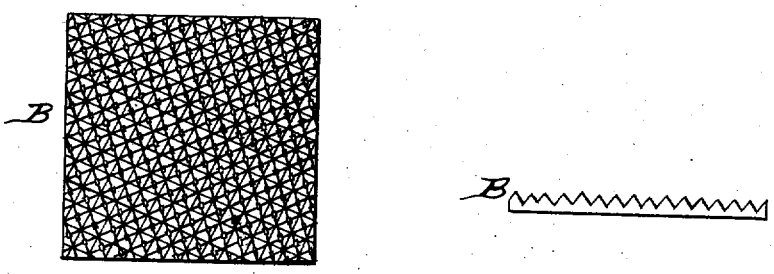

C. REIF.

Clover Huller.

No. 1,135. Reissued Feb. 5, 1861.

A. PETERS, Photo-Lithographer, Washington, D. C.

UNITED STATES PATENT OFFICE.

CHRISTIAN REIF, OF HARTLETON, PENNSYLVANIA.

IMPROVEMENT IN CLOVER SEPARATORS.

Specification forming part of Letters Patent No. 11,493, dated August 8, 1854; Reissue No. 1,135, dated February 5, 1861.

*To all whom it may concern:*

Be it known that I, CHRISTIAN REIF, of Hartleton, in the county of Union and State of Pennsylvania, have invented certain new and useful Improvements in Clover Separators and Hullers; and I do hereby declare that the following is a full, clear, and exact description of the operation and construction of the same, reference being had to the accompanying drawings, making a part of this specification, in which a vertical longitudinal section of the machine and a part of one of the cast-iron beds is shown.

In the first step in cleaning clover-seed from the husk or envelope the means employed previous to my improvement in the bed or concave of the rubbing portion of the machine were inefficient as rubbers. In the prosecution of manufacturing machines for the purpose of more perfectly divesting the seed of the husk I found that by employing as a bed a concave made of cast metal, in which the angular projections or points on its face furnished one of the rubbing-surfaces when employed with an armed revolving cylinder, a durable and efficient machine could be obtained, one not liable to be out of order, and in which the seed, by being longer retained on the bed or concave, would be more perfectly divested of the husk enveloping it. This constitutes the first part of my improvement. The second refers to the arrangement for cleaning the seed after it has passed from the hulling portion of the machine, and consists in so combining sieves and carriers that the seed shall be subjected to the action of the fan-blast in small quantities at a time sufficiently often to remove all hulls and other light impurities, and also to be separated from heavy impurities of nearly the same specific gravity, as will be hereinafter set forth.

To enable others skilled in the art to make and use my invention, I will proceed to describe its construction and operation.

In the drawings, A is a cylinder armed with spikes or rubbers, which I term the "hulling-cylinder." B is the concave or bed, made (in sections) of cast-iron, having its surface provided with angular projections, as shown in the separate figure. I do not, however, confine myself to the exact lines forming those projections, as they may be slightly varied.

C is a hopper; D, a carrier or conveyer of the seed to the mill. F is a fan, and H the upper sieve, reciprocated by the rotation of the fan-shaft *a* through crank *b* and rod *c* and *d*. This sieve is formed of two parts, the upper and nearest the mill sufficiently above the lower one, *f*, to admit of the blast passing through the opening *i* and sweeping the surface of the lower portion of the sieve. Below sieve H is a carrier, I, moved in the direction shown by the arrows, which carrier receives the seed as it drops from the sieve H and conveys it over the shaft *m*, as shown by arrow 3. After leaving the carrier I the seed is received upon the lower carrier, J, and, being conveyed over the shaft *n*, is drawn upon the lower sieve, *q*, through which the cleaned and perfect seed passes to the receptacle P, while the impurities larger than the seed, but of nearly the same specific gravity, pass over the sieve and drop into the receptacle R, as shown by arrow 4.

During the entire passage of the seed through the cleaning machinery it is acted upon by the fan-blast, and at many points in a very divided state, the division of the upper screen giving it a free sweep over the surface of the lower portion, while, as the seed falls to the carrier I, the blast passes through it, and again in its fall between the two carriers. The sheet passing over the shaft *m* is so thin that the remaining hulls and light impurities cannot fail to be driven off through the mouth M. The poard *p* serves to arrest the light grains of seed and cause them to drop into the receptacle T. The tailings from the upper sieve will also drop into the same box.

I do not claim any of the parts of my machine separately considered; but,

Having described my improvements, what I claim as my invention, and desire to secure by Letters Patent; is, 1. The employment of a cast-metal bed or concave in which the angular projections on its face, as described, furnish one of the rubbing-surfaces when used with a revolving cylinder, A, armed with spikes, constructed in the manner and for the purposes set forth.

2. The herein-described arrangement of sieves H and *q* and carriers I and J, for cleaning clover-seed, substantially as herein fully set forth.

In testimony whereof I have signed my name before two witnesses.

CHRISTIAN REIF.

Witnesses:

JOHN F. CLARK,
EDM. F. BROWN.